United States Patent [19]

McKeown

[11] Patent Number: 4,765,854

[45] Date of Patent: Aug. 23, 1988

[54] METHOD OF PRODUCING DISPOSABLE HEADDRESS

[75] Inventor: Thomas J. McKeown, Pennsauken, N.J.

[73] Assignee: Cellucap Manufacturing Co., Philadelphia, Pa.

[21] Appl. No.: 45,825

[22] Filed: May 1, 1987

Related U.S. Application Data

[62] Division of Ser. No. 812,269, Dec. 23, 1985, Pat. No. 4,691,390.

[51] Int. Cl.$^4$ .................. B32B 7/14; B65H 81/00
[52] U.S. Cl. ..................................... 156/161; 2/68; 2/197; 156/176; 156/202; 156/204; 156/229; 156/322
[58] Field of Search ........... 156/202, 213, 200, 308.4, 156/581, 438, 164, 161, 465, 474, 461, 494, 498, 176, 497, 499, 229, 322, 204; 2/68, 197, 200

[56] References Cited

U.S. PATENT DOCUMENTS

| | | | |
|---|---|---|---|
| 2,423,237 | 7/1947 | Haslacher | 156/497 X |
| 2,432,662 | 12/1947 | Gardner | 2/68 |
| 2,490,451 | 12/1949 | Magid | 156/161 |
| 2,798,523 | 7/1957 | Barrett | 156/202 |
| 3,005,484 | 10/1961 | Kuconis | 156/438 |
| 3,411,968 | 11/1968 | Vilutis et al. | 156/176 |
| 3,560,292 | 2/1971 | Butter | 156/229 |
| 3,591,434 | 7/1971 | Hartstein | 156/176 |
| 3,756,878 | 9/1973 | Willot | 156/202 |
| 4,485,495 | 12/1984 | Lunt | 2/197 |
| 4,560,434 | 12/1985 | Sato | 156/474 |
| 4,626,305 | 2/1986 | Suzuki et al. | 156/229 X |

Primary Examiner—Michael Ball
Assistant Examiner—David Herb
Attorney, Agent, or Firm—Walter B. Udell

[57] ABSTRACT

A method of sequentially producing a plurality of disposable headdresses in which the edge of the cap fabric has been folded inward around a peripherally extending elastic cord to provide a smooth edge which contacts the wearer, and provides superior adhesion between the elastic cord and the cap fabric by utilizing an elastic cord and fabric which are coated with or made of thermoplastically compatible materials. The elastic cord and fabric are assembled by passing the fabric and the cord through a guide system which turns the fabric side edges down from a horizontal plane to a vertical plane while an edge guide lays the elastic cord under the fabric, and then turns the fabric under the cord to sandwich in the folded edge. Warm air preheaters heat the elastic cord and the fabric before completing the fabric fold around the cord. The folded edges with the cord inside pass between dual heat wheels which physically press the fabric to the cord and also seal the fabric edge to the inside of the crown. Pressure rollers press and cool the corded fabric contact to seal the cord and fabric together before they can separate. A cool air stream may be utilized after the pressure rollers to more firmly set the bond between the cords and the fabric. Finally, the sealed elastic cord fabric edge is raised slightly in the region where the end of the cap is formed just prior to transverse end sealing to insure capture of the cord end in the end seal and to eliminate any inward protrusions of the gathered sealed end which would press against the head of the wearer.

3 Claims, 8 Drawing Sheets

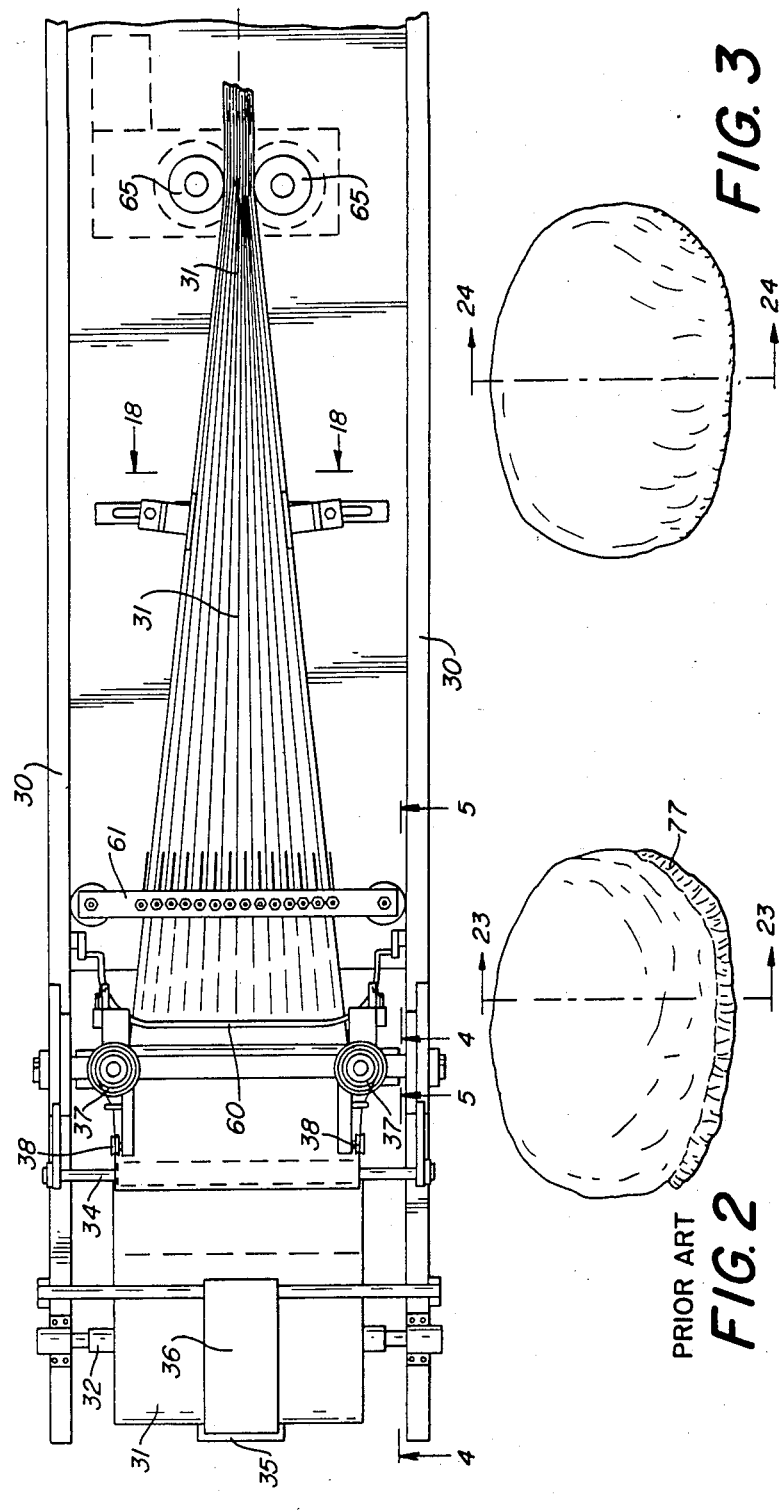

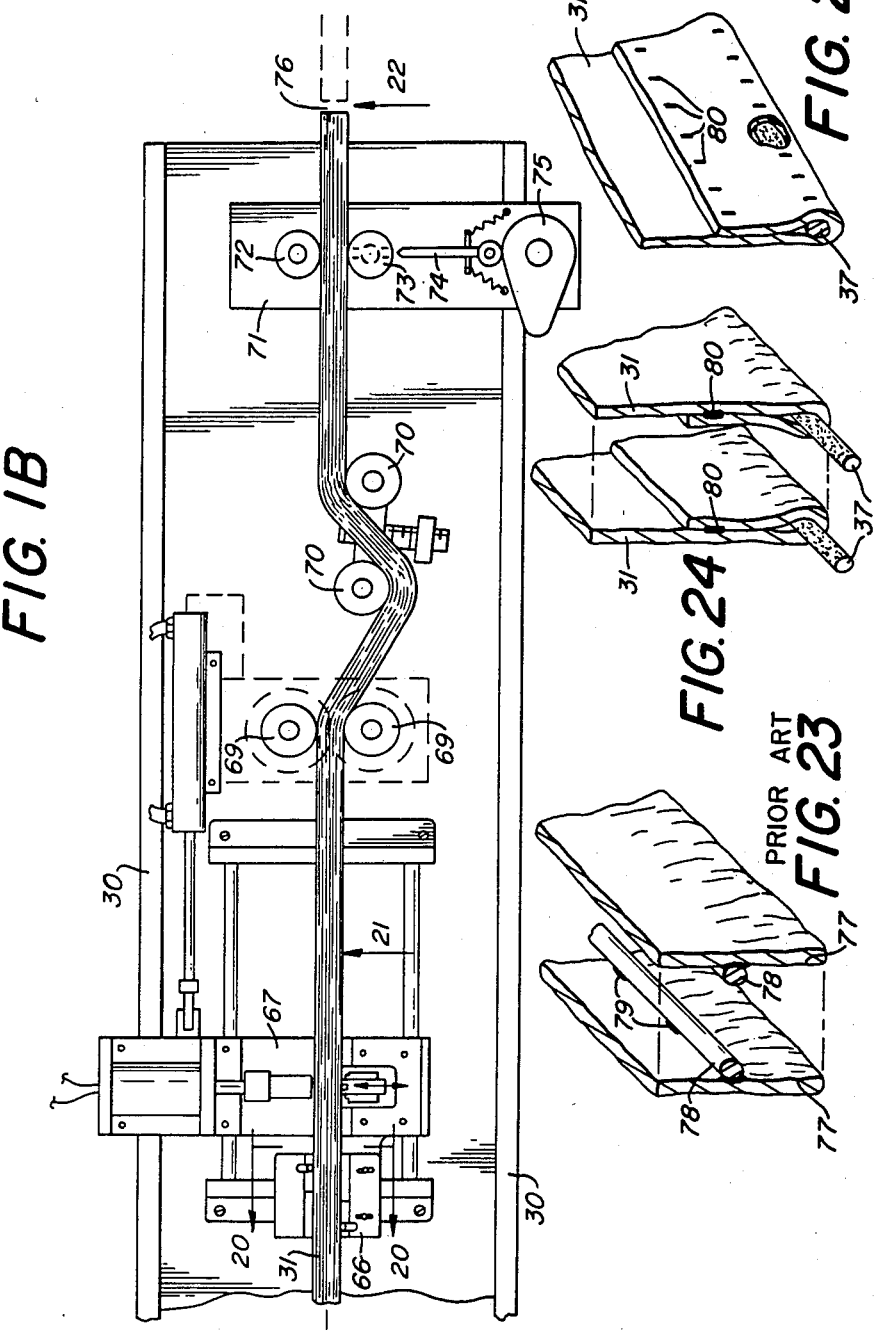

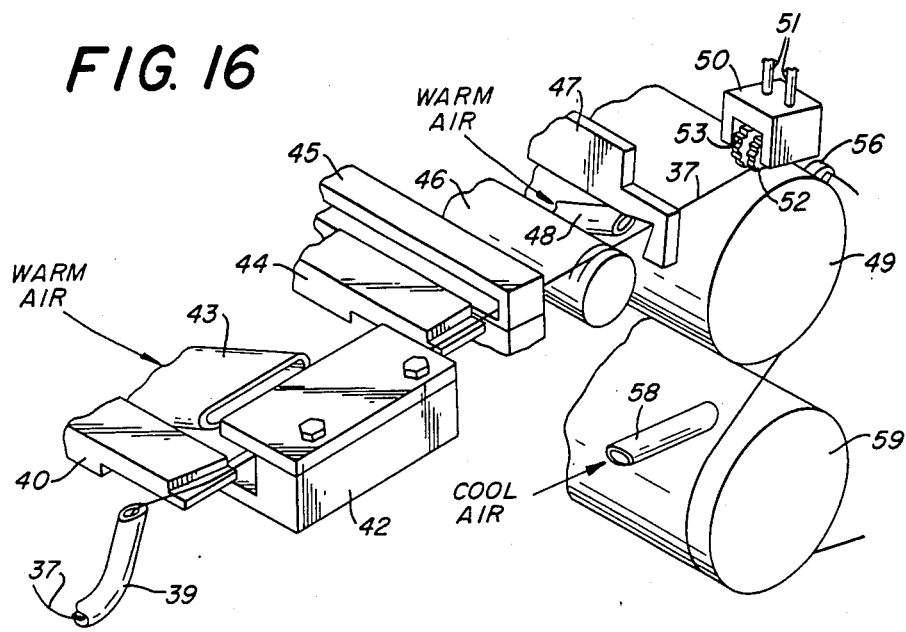
FIG. 16
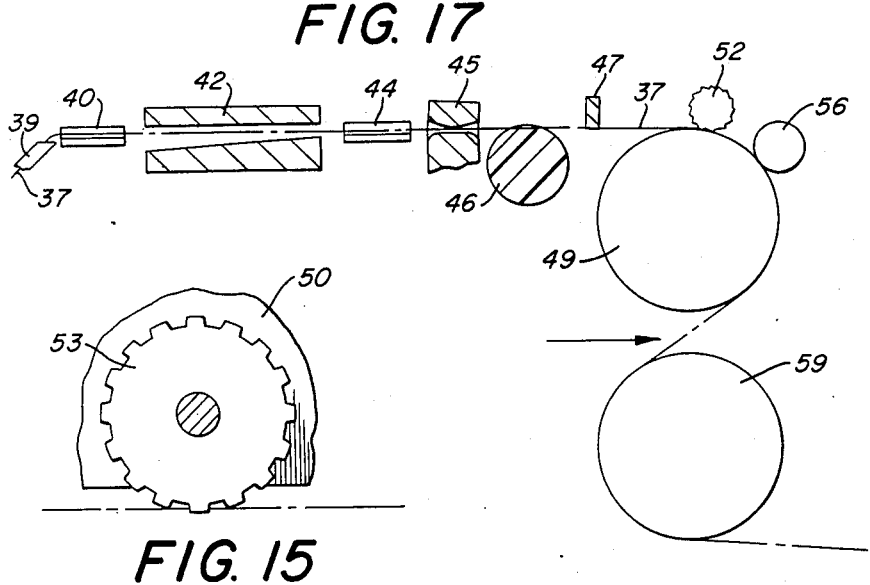
FIG. 17
FIG. 15

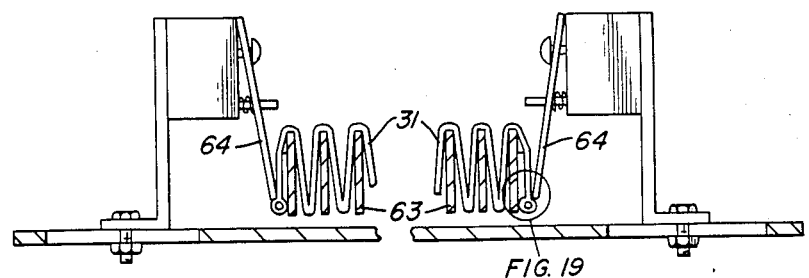
FIG. 18
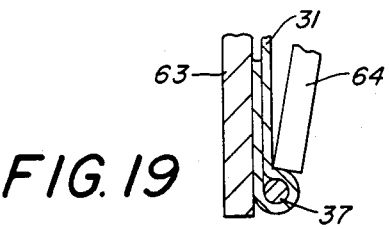
FIG. 19
FIG. 20
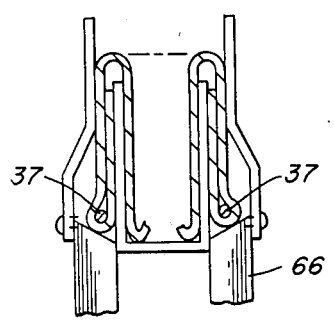
FIG. 21
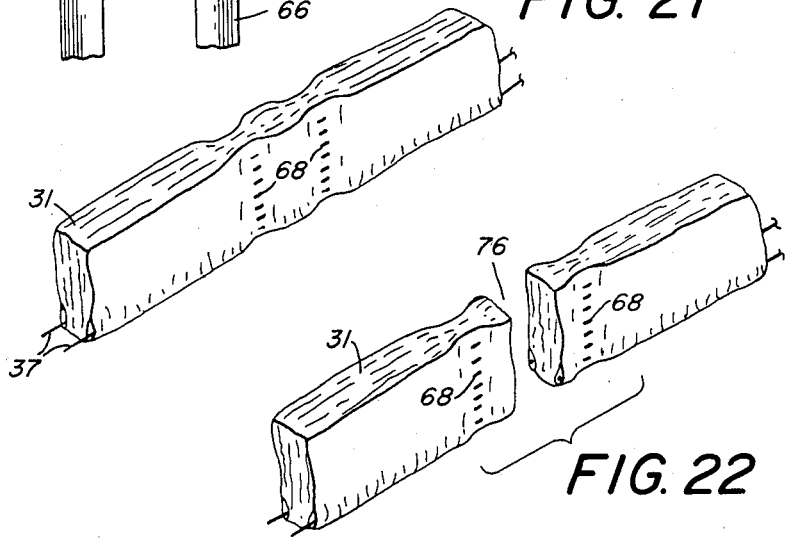
FIG. 22

METHOD OF PRODUCING DISPOSABLE HEADDRESS

This invention relates generally to disposable sanitary headdresses, and the apparatus and method for making the same, and is a division of copending U.S. application Ser. No. 812,269, filed Dec. 23, 1985, now U.S. Pat. No. 4,691,390. More particularly, the invention relates to headdresses of the type having wide applicability in the food handling industry and in other applications requiring a sanitary hair enclosure, as for example in medical operating rooms and other sterile environments.

The headdress according to the invention is generally of the type shown in U.S. Pat. No. 3,403,409 assigned to the same assignee as the present invention, but differs therefrom in several particulars, including the elimination of a stitching process for securing an elastic cord to the peripheral edge of the headdress and the elimination of a metal securing staple. The general structure of the headdress shown in the above referred to patent was superceded to some degree by headdresses in which the elastic cord was heat sealed to the headdress instead of being stitched, and in which the metal securing staple was eliminated by the use of a transverse heat sealing step.

The headdresses as just described suffer from several disadvantages. As a first matter, when heat sealing the elastic cord to the headdress, the cord necessarily was spaced inward from the edge of the headdress in order to insure alignment to avoid regions in which the cord might be spaced outward from the edge of the cap and consequently never sealed thereto. This produced a free marginal edge which was found in use to be objectionable because it could scratch and irritate the skin of the wearer. Additionally, it was found that the heat sealing of the cord to the cap fabric was not perfect, and resulted in an approximately 15% rejection rate of the finished product. Such a percentage of unmarketable product necessarily raised the cost of the product which was suitable for sale. Since the nature of such a headdress is that it is a disposable product to be used for a short time, perhaps one day or less, and disposed of, it is important to maintain the cost of such items at the absolute minimum.

The headdress according to the invention constitutes an improvement over these prior caps in that the raw edge of the cap has been eliminated by folding the edge inward around the elastic cord and securing it to the inside of the cap. Additionally, by wrapping the edge of the cap around the cord a far better adherence of the cord to the fabric of the cap is obtainable, and the rejection rate for defective product has been substantially eliminated.

These objectives are achieved by utilizing an elastic cord which is coated with a thermoplastic material compatible with the fabric from which the cap is made, as for example, polypropylene coated elastic cord may be used with polypropylene fabric, or polyester coated cord with polyester fabric. One major factor in improving the adherence of the cord to the fabric is utilizing a step of preheating the cord and fabric to slightly soften the thermoplastic material to thereby provide an immediate adherence between the cord and the fabric when they are brought into contact with one another during the fabrication process which results in substantially continuous sealing of the cord to the cap fabric.

The process of assembling the cord and the cap fabric is carried out by passing the fabric and the cord respectively through a roller and tubular cord guide system which turns the fabric side edges down from a horizontal plane to a vertical plane while an edge guide lays the stretched elastic cords under the fabric and turns the fabric under the cords to sandwich it in the folded edge. Warm air preheaters warm the air to approximately 300° F. and heat the stretched elastic cords and the fabric before completing the fabric folds around the cords. The folded fabric side edges with the cords inside pass between dual heat wheels which physically press the fabric to the cords and also seal the fabric side edges to the inside of the crown. The pressure rollers press and cool the corded fabric contact to seal the cords and fabric together before they can separate. A cool air stream may, if desired, be utilized after the pressure rollers to quickly set the bond between the cords and the fabric. Finally, the sealed elastic cord fabric edges are raised slightly in the region where the end of the cap will be formed just prior to the transverse end sealing to insure capture of the cords ends in the end seal and to eliminate any inward protrusion of the gathered sealed end which would press uncomfortably against the head of the wearer.

A primary object of the invention is to provide a novel sanitary headdress which eliminates the "granny" look by turning the edges of the headdress inward about the elastic cords and sealing the edges to the inside of the cap.

Another object of the invention is to provide a novel sanitary headdress as aforesaid in which a continuous seal is effected between the elastic cord sealed into the peripheral edge of the cap and the fabric of the cap to eliminate instances where the cord comes loose from the fabric of the cap.

A further object of the invention is to provide a novel sanitary disposable head cap as aforesaid in which the sealed edges are raised where the cap is transversely end sealed to eliminate any inward protrusion of the gathered sealed end.

A further object of the invention is to provide a novel method and apparatus for making the novel headdress as aforesaid.

The foregoing and other objects of the invention will become clear from a reading of the following specification in conjunction with an examination of the appended drawings, wherein:

FIG. 1A is a partial top view of the apparatus for producing the novel headdress according to the invention, and shows the left-hand end of the apparatus in which the material forming the headdress is moving from the left toward the right;

FIG. 1B is a continuation of FIG. 1A and continues the flow of the headdress from left to right to completion of the product;

FIG. 2 is a side elevational view of a cap similar to that of the invention, but showing the undesirable "granny" look having a ruffled edge of the cap material;

FIG. 3 is a side elevational view of the novel headdress according to the invention showing the smooth lower edge of the cap which eliminates the "granny" look;

Figure 4:
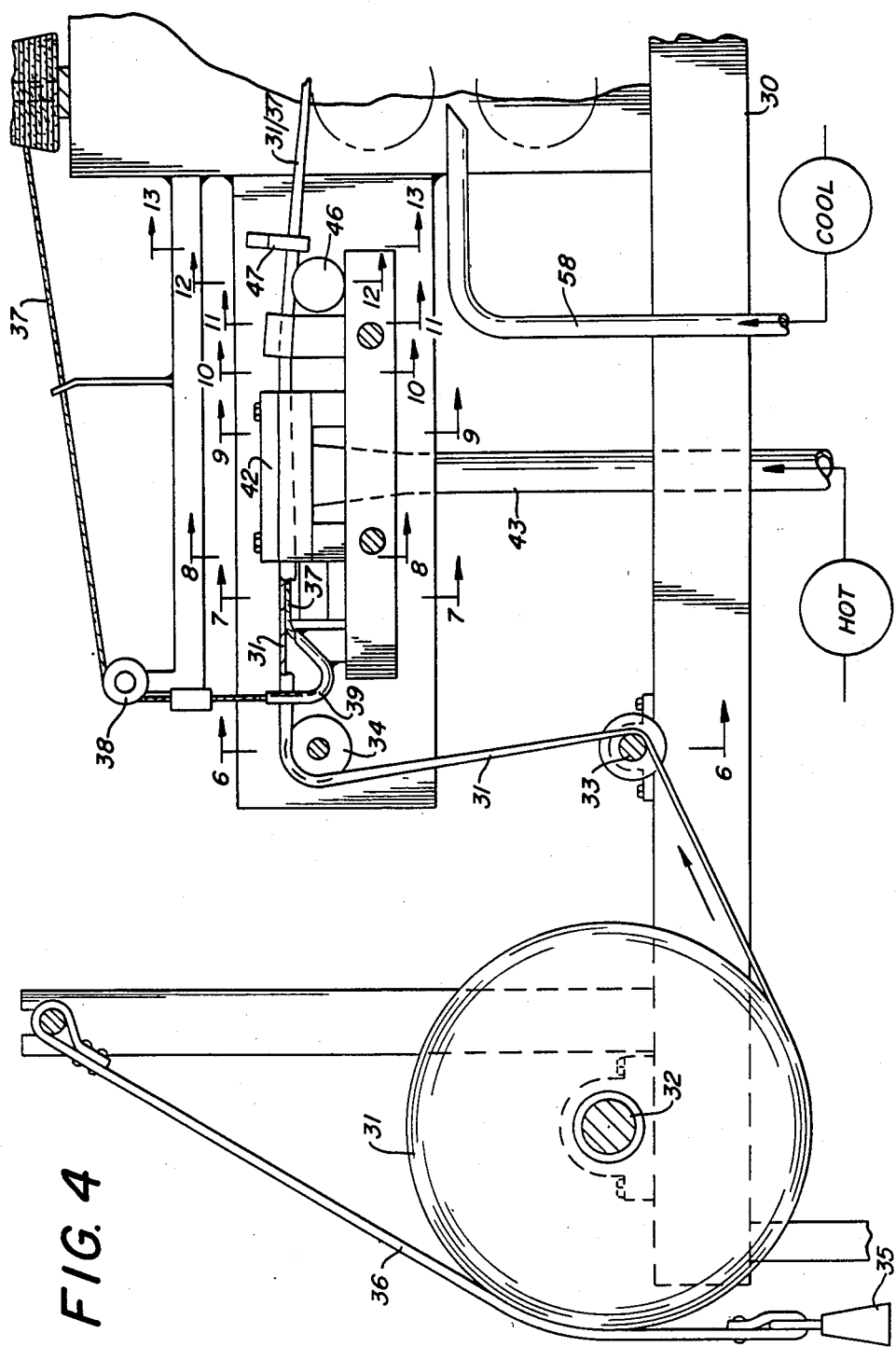
Figure 5:
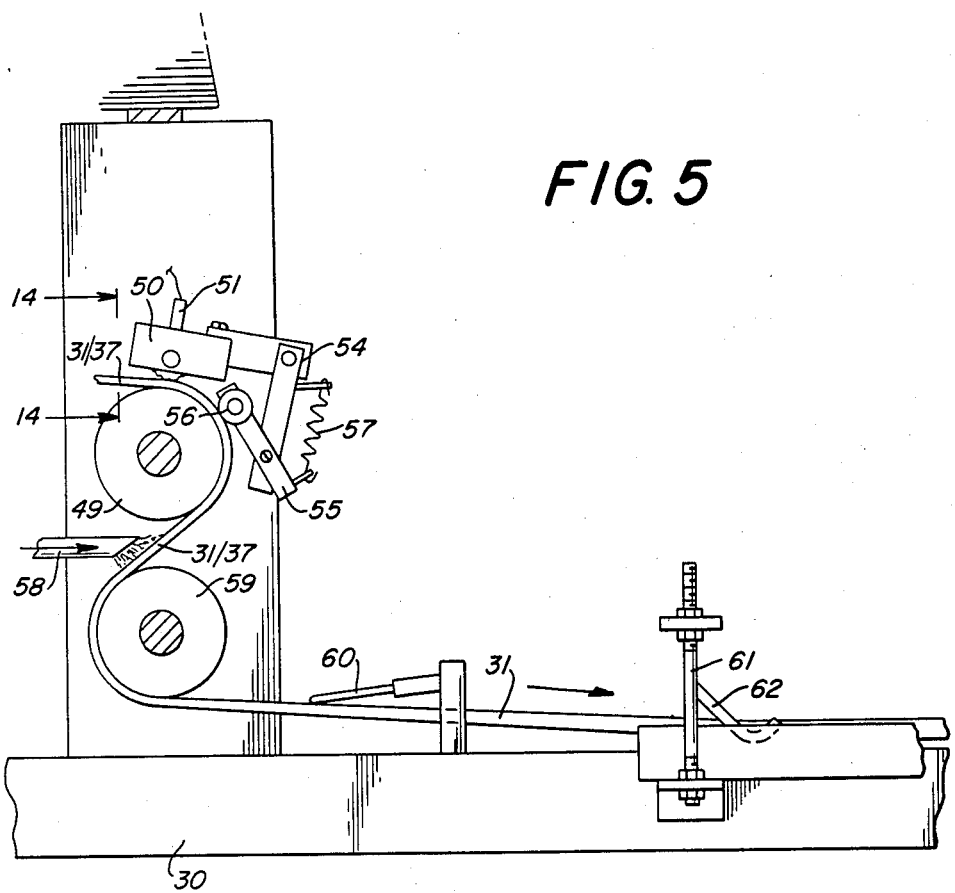
Figure 14:
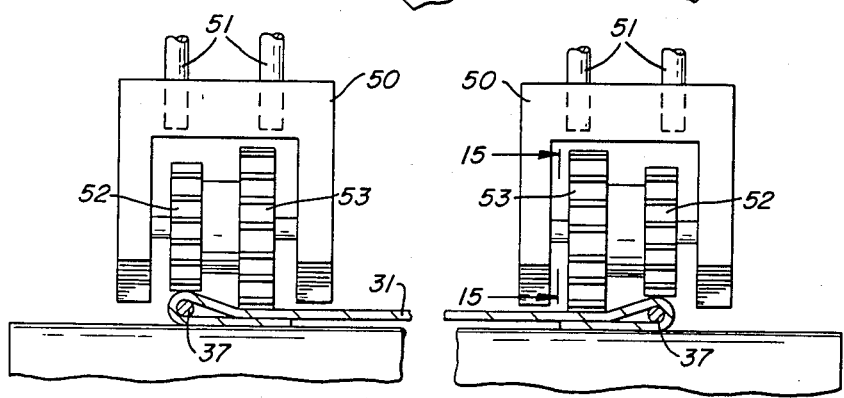

FIGS. 4 and 5 are side elevational views of those parts of the apparatus shown in FIG. 1A as would be seen when viewed along the lines 4—4 and 5—5 respectively on FIG. 1A;

FIGS. 6 through 14 are vertical sectional views through the apparatus as would be seen when viewed along the lines 6—6 through 14—14 respectively on FIGS. 4 and 5;

FIG. 15 is a vertical view from one side of a heat sealing roller as would be seen when viewed along the lines 15—15 on FIG. 14;

FIG. 16 is an isometric view of the portion of the apparatus shown in FIGS. 4 and 5 with various pieces of the structure removed, and with the cap fabric removed to show the path of the elastic cord as it goes through the forming apparatus;

FIG. 17 is a vertical sectional view through the isometric view of FIG. 16 illustrating the same flow path;

FIG. 18 is a vertical cross-section on an enlarged scale as would be seen when viewed along the lines 18—18 on FIG. 1A disclosing details of the pleating arrangement;

FIG. 19 is an enlarged detail view as would be seen in the phantom circle on FIG. 18;

FIG. 20 is an enlarged cross-section through the apparatus as would be seen when viewed along the lines 20—20 on FIG. 1B, and showing the raising of the fabric web edges elastic cord lines slightly above the interior pleats;

FIG. 21 is an isometric showing of the pleated headdress at the point indicated by the number 21 on FIG. 1B showing the end sealing between two adjacent headdresses;

FIG. 22 is similar to FIG. 21 but shows the headdresses severed between the transverse heat sealing lines which occurs at the place indicated at 22 on FIG. 1B;

FIG. 23 is an enlarged detail as would be viewed along the lines 23—23 of FIG. 2 showing the unsatisfactory prior known structure of an elastic cord sealed to the cap fabric at spaced apart points;

FIG. 24 is an enlarged isometric view through the cap of FIG. 3 as would be viewed along the lines 24—24 thereof showing the elastic cords completely sealed and enfolded within the cap edges, and the cap edges turned inside and sealed to the crown fabric; and FIG. 25 is an isometric view of a portion of the inside lower edge of the cap as seen in FIG. 24 with a portion of the inside turned up marginal edge sectioned away to disclose the adhesive on the entire surface of the elastic cord.

In the several figures, like elements are denoted by like reference characters.

Figure 6:
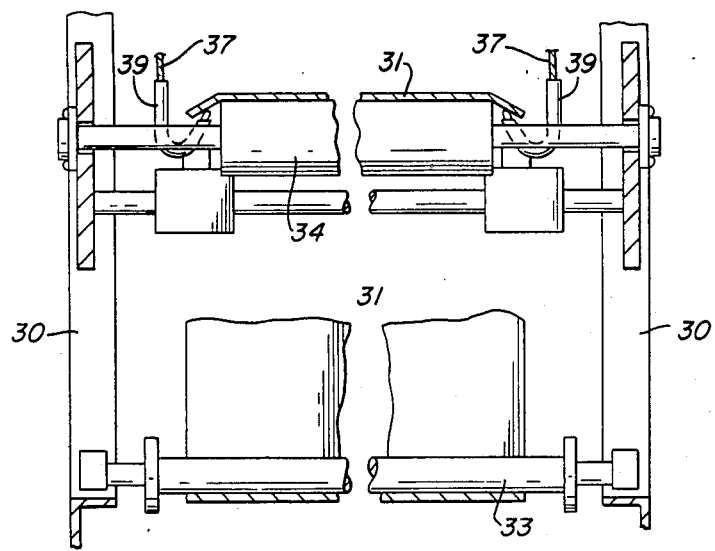

Considering now the drawings, and first FIGS. 1A, 1B, 4 and 5 which show the general structure of the apparatus, there is seen a frame 30 which supports all of the other parts of the apparatus, including a fabric roll 31 rotatably mounted on an axle 32 from which the fabric to form the headdresses spools off, as is shown by the arrow in FIG. 4, and moves upward around the idler roller 33 and breakover shaft 34 to then move horizontally to the right through the apparatus. A weight 35 holds a strap 36 which is secured at its upper end against the side of the fabric roll to frictionally restrain the rotation of the roll and prevent it from uncontrollably unspooling. Secured on the top of the frame 30 at opposite sides of the fabric web 31 are spools of thermoplastically coated elastic cord 37, the cord coming off of the spools, through cord tensioners 38 which stretch the cords, turning downward through cord guide tubes 39 and up beneath the side edges of the fabric web 31, all as best seen in FIGS. 4 and 6.

Figure 9:
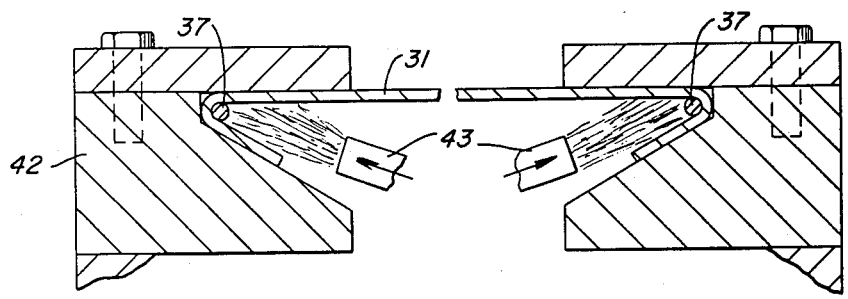
Figure 7:
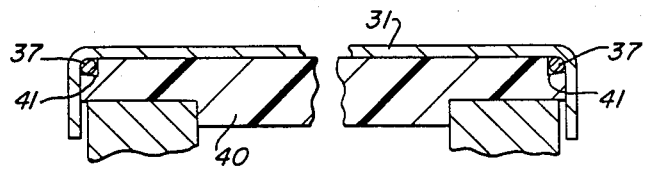
Figure 8:
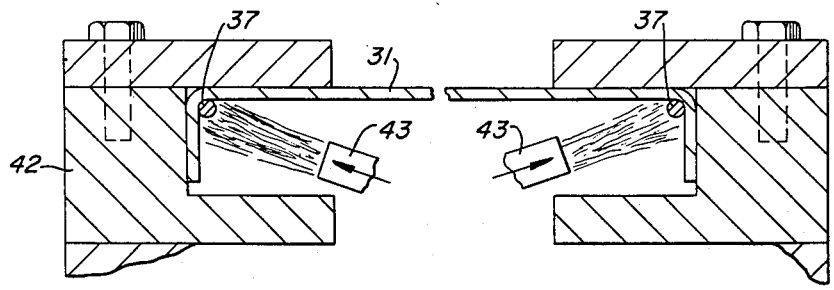

The fabric 31 and cords 37 run forward from the breakover shaft 34 to overlie an inside guide bar 40 around which the outside edges of the fabric web 31 are turned downward to capture the elastic cord 37 which are guided in slots 41 at the upper outer corners of the guide bar 40, all as best seen in FIG. 7. The turned down fabric web 31, with the elastic cords 37 positioned as shown in FIG. 7, runs to the right and into an outside guide structure designated generally as 42 in FIG. 4, and seen in more detail in FIG. 8. As best seen in FIG. 8, within the guide structure 2 the inside corner regions of the down-folded fabric edges and the coated elastic cords 37 are subjected to a flow of hot air through the heat tubes 43. The hot air softens the thermoplastic coating on the elastic rods and also tends to soften the thermoplastically compatible fabric in the cord region so that the cord and the fabric start to adhere to one another. The outside guide structure 42 turns inward as best seen in FIG. 9 so that the outer edges of the fabric web 31 are turned under the cords 37.

Figure 10:
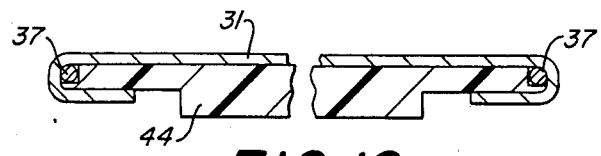
Figure 11:
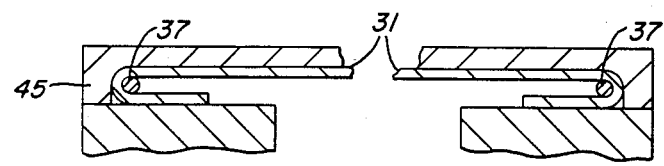
Figure 12:
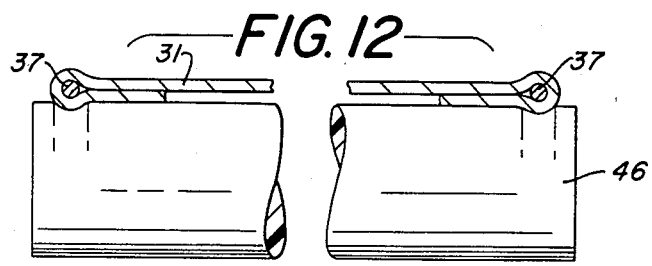
Figure 13:
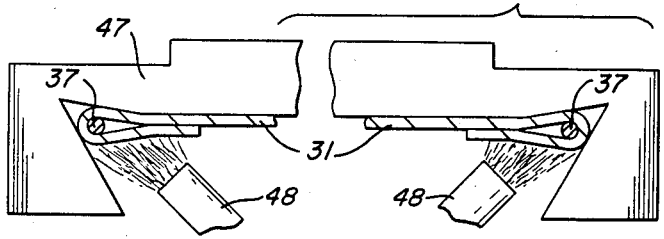

The web 31 and cords 37 continue movement to the right where, as best seen in FIG. 10, the web 31 is turned under the inside guide bar 44 and in this positional relationship with the stretched elastic cords 37 rides into the outside guide 45, as best seen in FIG. 11, and thereout over the grooved fixed guide bar 46, as seen in FIG. 12, at which point the outer edges of the fabric web 31 are completely wrapped around the elastic cords 37. The web 31 and cords 37 continue in this position into a third outside guide 47 where the cords and wrapped about fabric edges are subjected to a second flow of heated air from the heat tubes 48 to maintain the softened condition of the thermoplastic coatings.

As best seen in FIGS. 5 and 14 to 17, the web 31 with the elastic cords 37 moves to the right over an idler roller 49 and under two sets of heat rollers carried in heating blocks 50 electrically heated by means of the heaters 51. Carried by the heating blocks 50 are the idler heater wheels 52 and 53, the wheels 53 pressing downward to heat seal the turned under marginal edges of the web to the main body of the web 31, while the slightly smaller in diameter wheels 52 press the cords 37 into tight fusing contact with the wrapped around portion of the web 31.

Also secured to the block 50 and depending therefrom is a support bracket 54 having pivoted to its lower arm an arm 55 carrying a pressure roller 56 spring loaded by means of the spring 57 against the folded edges of the web 31. The web 31 with the elastic cords 37 sealed into the outer edges thereof continues moving around the idler roller 49 and has its edges subjected to a flow of cool air from the cooling tubes 58 just prior to reversing its direction beneath the idler roller 59.

The web 31 passes beneath a flattening bar 60 and then begins a horizontal inward folding movement as it passes to a pleater 61 which vertically pleats the web from the top by means of the pleater rods 62, the web continuing to be pleated more deeply and narrowed horizontally as it moves to the right into engagement with the bottom pleater mechanism shown in FIG. 18. As best seen in FIGS. 18 and 19, the bottom pleater includes a set of horizontally spaced vertical bars 63 over which the web 31 has been pleated with the outer edges of the web held downward by engagement of the guides 64 with the side edges of the web just above the enclosed elastic cords 37.

With the pleated web as shown in FIG. 18, the web is drawn through the pinch rollers 65 and to the right where the pleated web 31 passes through the cord height adjuster 66 best seen in FIGS. 1B and 20. As the web passes through this cord height adjuster 66, the marginal edges of the web containing the cords 37 are raised slightly above the bottom of the pleated web which lies therebetween just prior to passage of the web through the transverse sealer 67 shown in FIG. 1B which transversely seals all layers of the web together simultaneously at two slightly spaced apart longitudinal regions of the web, as best seen at 68 in the showing of FIG. 21.

The web then continues on to the right to a second set of pinch rollers 69 and a spring-loaded set of take-up rollers 70 to a cut-off mechanism 71 which includes a pair of rollers 72 and 73, the latter of which includes a diametrically extending channel through which a cut-off knife 74 is reciprocably drivable by means of the cam 75 to sever the web between each pair of transverse seals 68, as best seen in FIG. 22 at 76. The rotation of the roller 73 is synchronized with the movement of the cam 75 by means of a Geneva movement to insure that the cut-off knife 74 is only reciprocated when properly aligned with the slot through the roller 73.

FIGS. 23, 24 and 25 show the essential differences between the prior art "granny" type of cap edge as shown in FIG. 2 and that according to the invention as shown in FIG. 3. In FIG. 2 the free edge of the cap, designated as 77, causes a ruffled edge which is scratchy and generally esthetically not considered desirable by users, this edge 77 being seen in FIG. 23. FIGS. 24 and 25 show the absence of this edge because of the reversely folded and secured marginal edges of the web 31 produced according to the invention.

Additionally, the elastic cords 78 in FIG. 23 are observed to be tacked at spaced intervals, as at 79 which has resulted in an insecure adhesion of the cords 78 to the cap edge and resulted in unacceptably high percentage of detachment of the cords from the web. FIGS. 24 and 25 disclose the much stronger bonding between the elastic cords 37 and the web 31 completely along the length of the cords because of the heat applied to the cords and the web prior to enwrapping them, and also shows the tacking, at 80 in FIG. 25, of the free edge of the web to the body of the web 31.

Having now described my invention in connection with a particularly illustrated embodiment thereof, modifications and variations of the invention may now naturally occur from time to time to persons normally skilled in the art without departing from the essential scope or spirit of the invention, and accordingly, it is intended to claim the same broadly as well as specifically as indicated by the appended claims.

What is claimed to be new and useful is:

1. A method of sequentially producing a plurality of headdresses from a longitudinally continuous running length of fabric of substantially constant width having a thermoplastic surface and elastic cords, consisting of the steps of,
    (a) placing the web in longitudinal tension,
    (b) positioning a thermoplastically coated elastic cord while in stretched condition parallel adjacent to and inward from each of the longitudinally extending free side edges of the web proximate to the web thermoplastic surface,
    (c) heating the cords and thermoplastic surface of the web to soften the thermoplastic materials,
    (d) turning the free side edges of the web inward around the stretched elastic cords to envelope the latter while securing the inturned free side edges of the web to the web and securing the stretched elastic cords continuously to the contiguous enveloping surfaces of the web by applying pressure to the web,
    (e) cooling the enveloped corded web contact to seal the cords and web together before they can separate, by thermally fusing their surfaces together,
    (f) pleating the web,
    (g) tightly securing together against relative movement the pleats of the tensioned web and the secured stretched elastic cords at a predetermined fixed spacing interval along the length of the tensioned web, and severing the web at points lying outside of the said fixed spacing interval.

2. A method of producing headdresses as set forth in claim 1 wherein the step of heating the cords and web thermoplastic surfaces consists of blowing hot air thereon before completing the folding of the web around the cords.

3. A method of producing headdresses as set forth in claim 1 wherein the step of cooling the enveloped corded web contact consists of blowing cool air thereon.

* * * * *